United States Patent [19]

Stamps et al.

[11] Patent Number: 4,489,647
[45] Date of Patent: Dec. 25, 1984

[54] FOOD FRYING AND DISPENSING APPARATUS

[76] Inventors: Kenneth H. Stamps, 1825 Glouchester, Garland, Tex. 75040; Clifford A. Watson, 2822 Glenbrook, Garland, Tex. 75041

[21] Appl. No.: 530,014

[22] Filed: Sep. 9, 1983

Related U.S. Application Data

[63] Continuation-in-part of Ser. No. 372,970, Apr. 29, 1982, abandoned.

[51] Int. Cl.³ .............................................. A47J 37/12
[52] U.S. Cl. ................................ 99/336; 55/DIG. 36; 55/279; 98/115.1; 99/337; 99/344; 99/356; 99/407; 169/65
[58] Field of Search ................. 99/336, 337, 342, 343, 99/344, 403, 407, 408, 444, 356; 55/279, DIG. 36; 126/299 D, 299 F, 300, 388; 98/115 R; 169/65; 426/523, 508

[56] References Cited

U.S. PATENT DOCUMENTS

| | | | |
|---|---|---|---|
| 1,720,830 | 7/1929 | Gallowitz | 99/343 |
| 2,219,949 | 10/1940 | Childs | 99/408 X |
| 2,337,481 | 12/1943 | Lowe | 99/408 |
| 2,712,295 | 7/1955 | Haynes | 126/388 X |
| 2,748,243 | 5/1956 | Michaelis | 99/403 |
| 3,213,778 | 10/1965 | Martino | 99/342 X |
| 3,391,689 | 7/1968 | Roger | 55/DIG. 36 |
| 3,448,677 | 6/1969 | Dexters | 99/407 X |
| 3,463,077 | 8/1969 | Lescure | 99/408 |
| 3,667,373 | 6/1972 | Sicher | 99/407 |
| 3,685,432 | 8/1972 | Hoeberigs | 99/407 X |
| 3,785,124 | 1/1974 | Gaylord | 55/DIG. 36 |
| 3,818,820 | 6/1974 | Harris | 99/336 X |
| 3,869,972 | 3/1975 | Chase | 99/408 X |
| 3,971,307 | 7/1976 | Graham | 99/403 |
| 3,981,232 | 9/1976 | Williamson | 99/408 X |
| 4,356,870 | 11/1982 | Gaylord | 169/65 |

FOREIGN PATENT DOCUMENTS

| | | | |
|---|---|---|---|
| 2303448 | 10/1976 | France | 99/403 |
| 473144 | 10/1937 | United Kingdom | 55/279 |

Primary Examiner—Billy J. Wilhite
Attorney, Agent, or Firm—Kanz, Scherback & Timmons

[57] ABSTRACT

Food frying and dispensing apparatus is disclosed which is housed in a supporting cabinet and includes a device for holding a supply of cooking oil and a heating device for maintaining the temperature of the cooking oil sufficiently high for cooking successive batches of food products introduced into the oil by a food support basket. A fan assembly exhausts air through the top of the cabinet. A derated precipitator, a charcoal filter, a fragrance holding apparatus and an ozone generator are positioned upstream of the fan assembly and in the path of air flow to eliminate any smoke or odor produced within the apparatus prior to discharge of the air from the cabinet. Food handling apparatus pivotally positions the food support basket in three separate and distinct positions with the three positions being in the cooking oil in a "cook" position, out of the oil in a food product "dispense" position and out of the oil in a "ready" position. The food handling apparatus is automatically moved to and locked in the "ready" position after the food product has been dispensed from the food frying and dispensing apparatus. The device for holding a supply of cooking oil is designed to hold the minimum amount of cooking oil to perform the cooking function and includes a cold zone in the lower portion of the device to trap and hold any food debris which is deposited into the oil.

29 Claims, 22 Drawing Figures

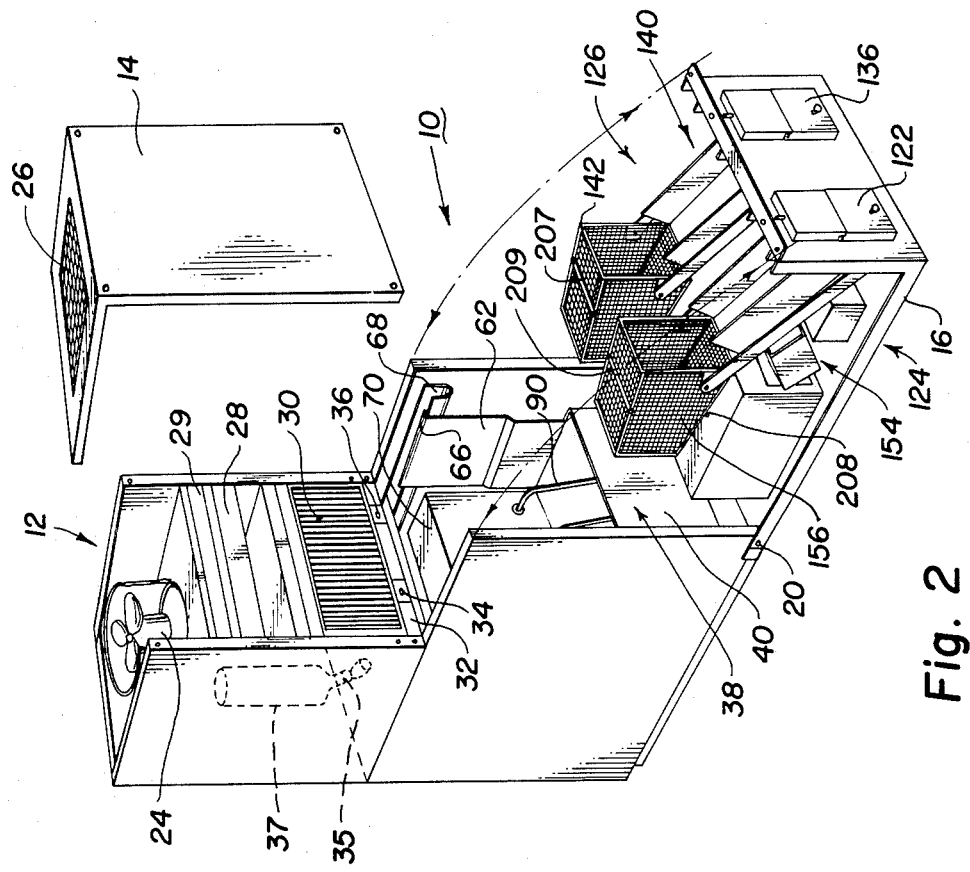
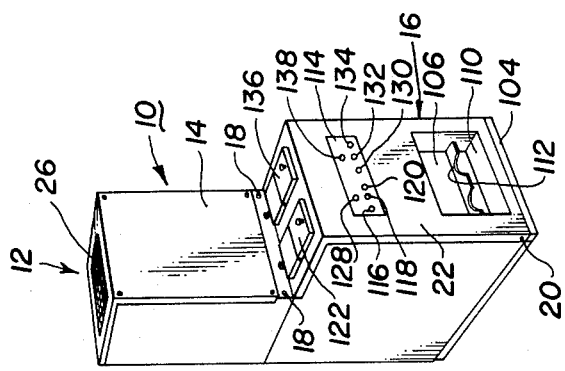
Fig. 2
Fig. 1

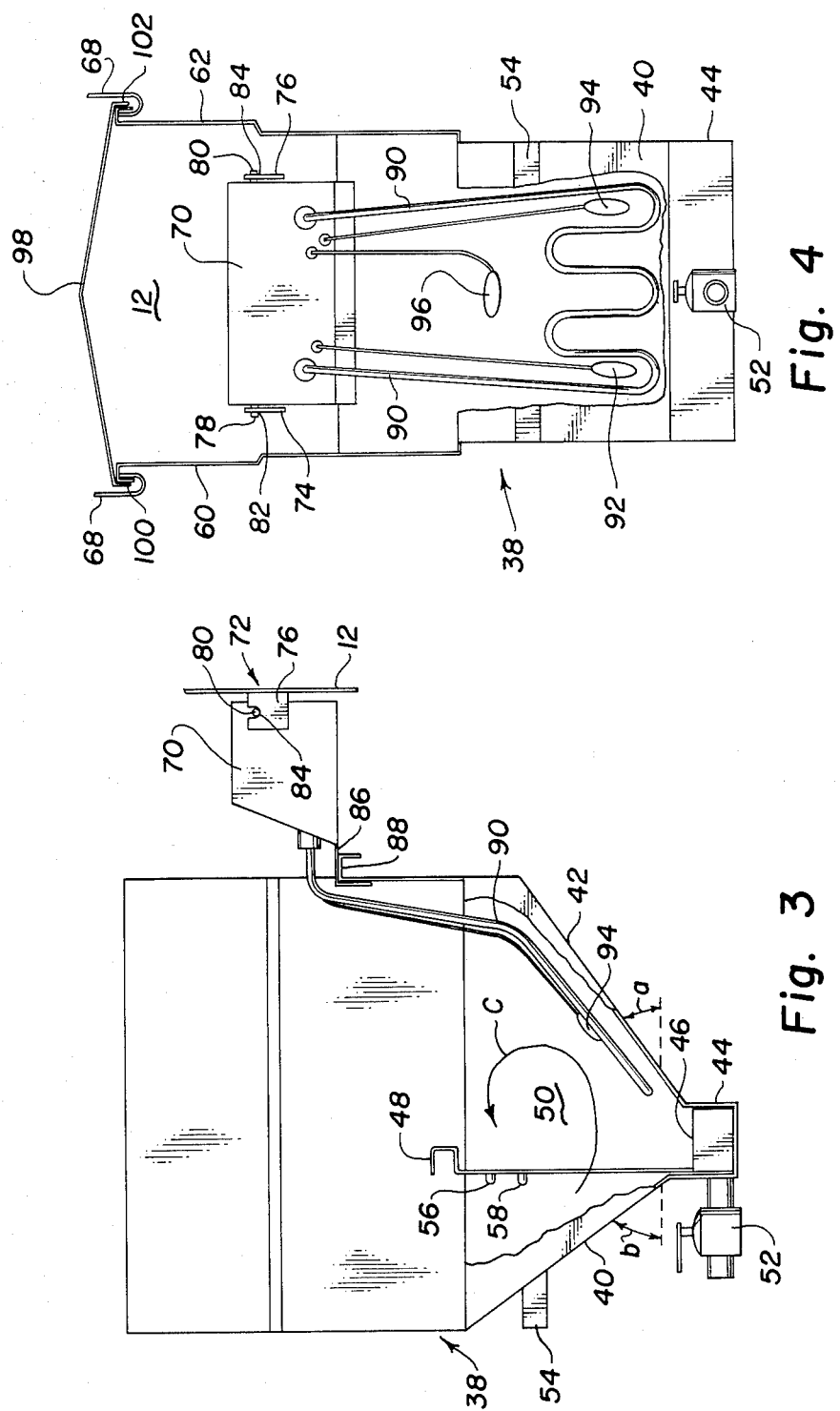

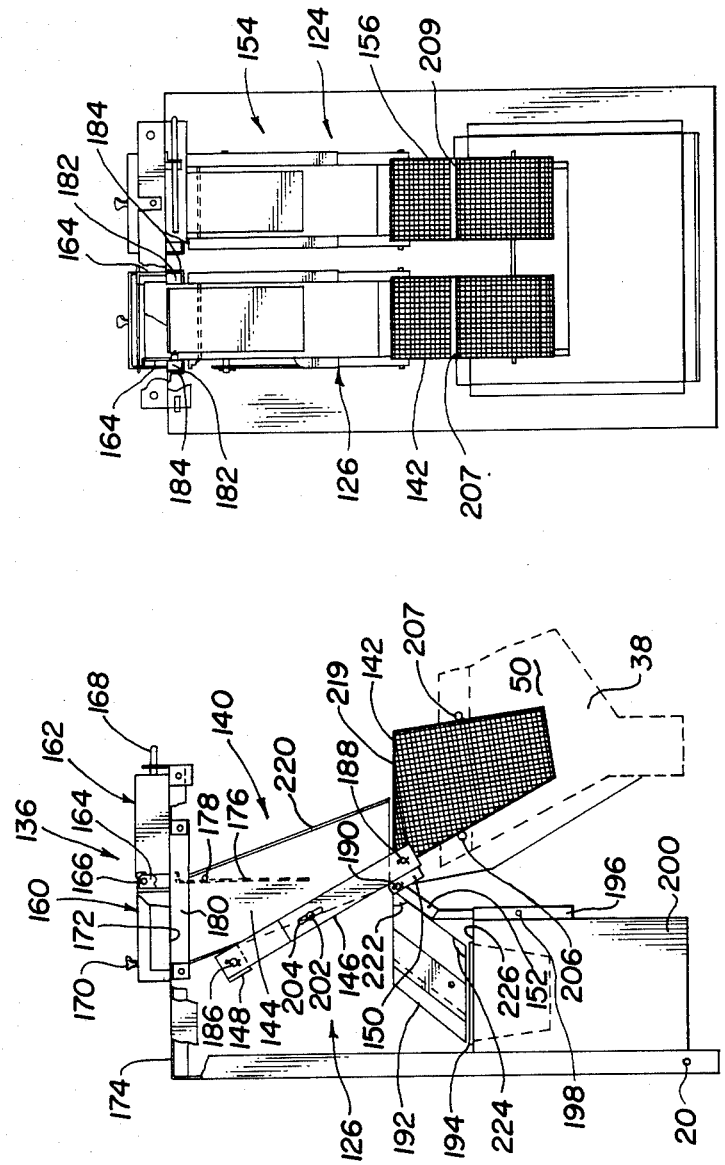

FOOD FRYING AND DISPENSING APPARATUS

DESCRIPTION

This is a continuation-in-part of application Ser. No. 372,970 filed Apr. 29, 1982 entitled "Food Frying and Dispensing Apparatus" now abandoned.

TECHNICAL FIELD

The present invention relates in general to food preparation. More particularly, this invention relates to apparatus for the deep-fat frying of food, and specifically is directed to semi-automatic, deep-fat frying apparatus for for the frying of food in a consumer environment by the customer/consumer or attendant without risk of food contamination by human contact or without risk of contact with the hot cooking oil by the customer while essentially eliminating the introduction of smoke and/or odor into the surrounding environment.

Although the present invention is applicable for deep-fat frying of numerous types of food products, it has been found to be particularly useful in the frying of frozen french-fry cut potato pieces by customers or attendants. Therefore, without limiting the applicability of the invention to "frying of frozen french-fry cut potato pieces", the invention will be described in this environment.

Deep-fat fryers or french fryers are widely used in the restaurant business for cooking various food products such as french-fried potatoes, fish and chicken. Typically, such french fryers comprise a deep tank containing a pool of cooking oil in the lower part of the tank with the cooking oil being heated by an immersed electric heating element or by a gas flame. The uncooked food product is placed in a basket which is lowered into the heated oil for the desired cooking period. When the product is done, as determined by visual inspection by the restaurant employee or the sound of an audio timer, the basket should be removed from the oil by the employee and the product served to a customer or transferred to a holding station where it is kept warm by heat lamps until served. This process requires the use of and occupies the time of the restaurant employee/operator. Also the food product is not always freshly fried under these conditions since the potatoes are cooked in large quantities which may not be used immediately and tend to cool down before being consumed. In the present inventive machine, the potatoes are cooked in small individual quantities, when a customer desires or orders it, by using an extremely short cooking cycle of less than 100 seconds. This short cycle is possible because the food product is precooked to a predetermined degree.

With the advent of consumer demand for freshly cooked, prepared on-site hot foods, the need for apparatus to provide hot food products such as french-fried potatoes, fish and chicken has increased. Since in this environment the cooking apparatus is normally operated by the limited manpower of consumer/attendant, the apparatus must be of the type which is easily and safely operated. The apparatus must also be reasonable in cost, be reliable in its operation and not pollute the surrounding environment without it being necessary to vent the cooking fumes to an area outside of the operating location.

BACKGROUND ART

In the prior art, various machines are known for processing and dispensing small batches or individual servings of a food product, such as french-fried potatoes. While a few of the machines have achieved some small degree of commercial acceptance, many others have not been successful.

U.S. Pat. No. 3,448,677 discloses an automated machine for selling fried foods which is coin operated. Upon depositing the correct coinage, a screw conveyor rotates to discharge food to be fried from a storage hopper onto a tray. The tray is balanced to tilt when it receives the proper weight of food with the tilting causing the screw conveyor to stop feeding food. When the tray tilts, it discharges the food into a basket immersed in hot cooking oil and also starts a timer running. When the time has run, a motor starts and through belts, pulleys, shafts, etc., dispenses a container for the food and then tilts the basket to discharge the fried food into the container.

U.S. Pat. No. 3,667,373 discloses an automated coin-operated fried potato machine containing a removable multiple bin supply tray to hold a predetermined quantity of potatoes in each bin and a mechanism to feed the potatoes from successive bins to a hopper which empties into a basket positioned within a cooking bowl. The cooking bowl is pivotally mounted above a storage vessel containing hot cooking oil. An oil lift assembly supplies oil from the storage vessel to the cooking bowl for each batch of potatoes and after the potatoes are fried, the basket is pivoted to dump the fried potatoes into a serving tray fed from a supply stack. The cooking bowl is pivoted to dump the oil through a removable and replaceable filter member and into the storage vessel.

U.S. Pat. No. 3,685,432 discloses an automatic coin-operated machine for cooking and dispensing fried foods which are stored within the machine in a conveyor. The conveyor contains holders for separate portions of food and dumps same into a supply funnel with multiple compartments, each of which is closed by a separately-operatable flap. From the funnel, the food is guided into a basket immersed in a vat of cooking oil. After a predetermined time, the basket is pivoted to drop the fried food into a serving container which is automatically fed from a supply stack.

U.S. Pat. No. 3,818,820 discloses an automatic machine for preparing fried potato products which contains a food hopper for storing the potatoes to be fried. A slidably mounted ejection scoop at the bottom of the food hopper dispenses the right amount of potatoes into a basket immersed into a vat of cooking oil. At the end of a predetermined time, the basket is pivoted to drop the fried potatoes into a waiting container. The machine also contains a fan to extract the fumes via a replaceable charcoal filter unit. An automatic fire extinguisher unit is mounted near the fume outlet to extinguish the oil if it should catch fire.

The present invention as claimed is intended to provide a solution to various prior art deficiencies including the reliability problems associated with the complex automated mechanisms. Also the high initial cost of the automated mechanisms as well as the high cost of daily operation and maintenance. In addition, the unacceptable service requirements associated with the highly automated mechanisms. There is also the problem of air pollution by the odor and smoke emitted from some of the machines. Some machines also tend to allow small amounts of cooking oil to exit from the machine. Also, the relative large physical size of the automated units can limit the location of the mechanism as well as the need for an external exhaust. In some prior art devices which store the food, there is a risk of spoilage and contamination of the food. There is also the relatively long length of time before the customer receives the cooked food after depositing coins in the machine. There is also the tendency for some units to contaminate the cooking oil by allowing pieces of the fried food to remain therein, thereby requiring the frequent changing of the cooking oil. In some units, it is inconvenient and difficult to clean the parts in contact with the oil and oily foods because of the complex automated mechanisms. In addition, many machines are of a design which does not allow for fast and easy removal and replacement of parts and units.

DISCLOSURE OF INVENTION

The present invention provides a semi-automatic food frying and dispensing apparatus which may be easily and safely operated. The apparatus is a relatively small unit for table top mounting without a requirement for an exhaust duct external to the room where the apparatus is located. Emphasis is placed upon modular-type construction of an uncomplicated nature which allows easy removal and replacement of parts or units with a minimum of time and effort along with a minimum amount of daily attention to machine operation by the owner. Food frying and dispensing apparatus includes an upright cabinet which is generally L-shaped in side profile. A fan assembly is mounted in the uppermost portion of the cabinet and exhausts air through the top of the cabinet while drawing air in from the bottom portion of the cabinet. A derated precipitator, a charcoal filter and an ozone generator, followed by a fragrance holding apparatus, are positioned in the path of air flow upstream from the fan assembly to remove all odors, gases and smoke from the air. A container for holding a supply of cooking oil is located in the bottom portion of the cabinet and is configured to operate with a minimum amount of oil with a resulting decrease in BTU s required to operate the apparatus. Means for maintaining the temperature of the cooking oil sufficiently high for cooking successive batches of food products is removably attached to the cabinet. A fire extinguisher is automatically activated in case of fire in the apparatus. One or more individual and separate food handling apparatus are removably attached to a lower cabinet door.

Each food handling apparatus includes a cooking basket, a lid assembly which is movable by the user to three different positions to pivot the cooking basket to three different positions, a chute assembly attached to the lid assembly to guide the deposited food into the cooking basket while the cooking basket is immersed in the cooking oil, and link and support assemblies connecting the lid assembly to the basket such that movement of the lid assembly causes the basket to pivot from the immersed position in the oil to the discharge or dispense position. Upon release of the lid assembly, the food handling apparatus moves to a "ready" position with the cooking basket positioned out of the oil so as to reduce any contamination of the oil by the basket. Means are provided on the cooking basket and exit chute (for the food) to direct any oil thereon into a drip pan located at the bottom of the cabinet and prevent same from leaving the cabinet.

In addition to the fire extinguisher, which extinguishes any fire when activated by a fire and also shuts down or removes primary power to the apparatus 10 when activated, an over-temperature control also shuts down or removes primary power to the apparatus 10 when the cooking oil becomes hotter than a predetermined value.

Among the advantages offered by the present invention is the compactness, high reliability and safety features provided by the apparatus. The present invention allows the cooking to occur in an inside area without need for an external exhaust. The present invention facilitates deep-fat frying of food without contacting the food with human hands or exposing the individual to the hot cooking oil. The present invention requires a minimum amount of cooking oil to be maintained for the cooking process and lengthens the use thereof by greatly reducing any contamination of the oil by food particles, by any contaminated oil being returned to the container of oil and by adding a minimum amount of fresh oil each day. The present invention allows the simultaneous cooking of one or more separate batches of food which are started, timed and controlled independently. The present invention provides food handling and dispensing apparatus which may be disassembled, without use of tools, for easy cleaning and replacement. The present invention also provides apparatus which is totally user operated. Warning systems in the present invention give indications to the user of low oil temperature and low oil level. Another advantage of the present invention is the low cost of daily operation of the apparatus.

Examples of the more important features of this invention have thus been summarized rather broadly in order that the detailed description thereof that follows may be better understood, and in order that the contribution to the art may be better appreciated. There are, of course, additional features of the invention that will be described hereinafter and which will also form the subject of the claims appended hereto. Other features of the present invention will become apparent with reference to the following detailed description of a presently preferred embodiment thereof in connection with the accompanying drawing, wherein like reference numerals have been applied to like elements, in which:

BRIEF DESCRIPTION OF THE DRAWING

FIG. 1 is a simplified perspective view of the food frying and dispensing apparatus according to the present invention;

FIG. 2 is a simplified perspective view of the food frying and dispensing apparatus according to the present invention with portions of the cabinet being displaced to expose apparatus to view;

FIG. 3 is a simplified side elevational view of the cooking oil container and the heater assembly of the present invention;

FIG. 4 is a simplified front elevational view of the cooking oil container and the heater assembly of the present invention;

FIG. 5 is a simplified elevational view of the food handling apparatus of the present invention in the cook position;

FIG. 6 is a simplified rear elevational view of the food handling apparatus of the patent invention in the cook position;

BEST MODE FOR CARRYING OUT THE INVENTION

Figure 8:
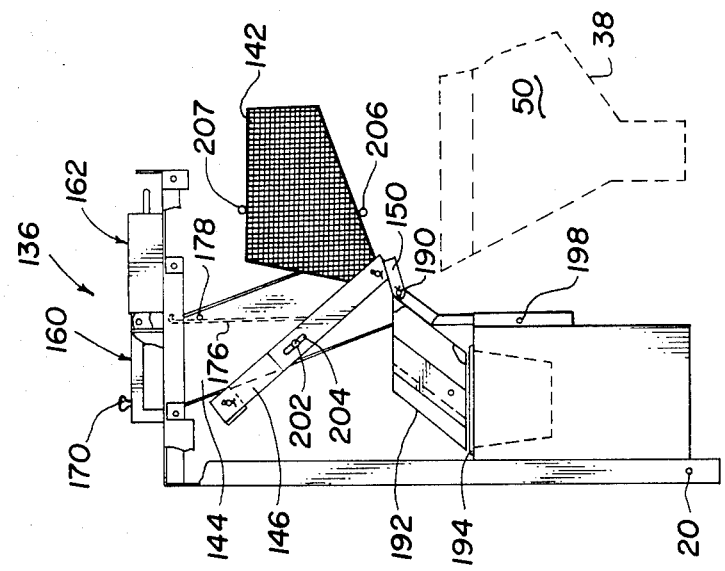
FIG. 8 is a simplified side elevational view of the food handling apparatus of the present invention in the ready position.

Referring now to the drawing, and in particular to FIGS. 1 and 2, food frying and dispensing apparatus according to the present invention is generally referred to by reference numeral 10. The food frying apparatus 10 includes an upright cabinet 12 which is generally Lshaped in side profiles. Access to the inside portions of cabinet 12 is provided through a removable upper cover 14 and a removable lower cabinet 16. Upper cabinet cover 14 is removably attached to cabinet 12 by two threaded bolts or screws 18 which include knurled heads of a sufficient size to allow easy attachment and removal by hand without the use of tools. Lower cabinet door 16 is removably attached to cabinet 12 by two of the same bolts or screws 18 which help attach upper cabinet cover 14 together with two threaded bolts or screws 20. Bolts or screws 20 also include knurled heads of a sufficient size to allow easy attachment and removal by hand without the use of tools. Bolts or screws 20 are oriented at right angles to the front panel 22, such that upon removal of the two bolts or screws 18, lower cabinet door 16 may be pivoted away from cabinet 12 to allow access to the interior of cabinet 12 without the need to completely remove lower cabinet door 16.

The food frying and dispensing apparatus 10 may generally be divided into two areas with the first area being one wherein the air within the cabinet 12 is cleaned and deodorized before it is exhausted through aperture 26. This air-cleaning area and the apparatus to move and clean the air are located within the upper portion of cabinet 12 behind upper cabinet cover 14 and includes fan assembly 24 which, in the preferred embodiment, is positioned uppermost in cabinet cover 14. Filter module 28 is mounted below and upstream of fan assembly 24. In the preferred embodiment, filter module 28 is slidably mounted within cabinet 12 for easy and quick insertion and removal. Filter module 28 comprises an activated charcoal filter with separate fragrance elements added above the module. Although the charcoal particles will remove 99% of the oil odors and cooking odors in the air which exits from apparatus 10, the fragrance elements assure that all possible odors are not offensive to the surrounding environment by masking any odors not removed by the charcoal particles. Precipitator module 30 comprises a two stage pennytype and is located below and upstream of filter module 28 in cabinet 12 and in the preferred embodiment is slidably mounted therein for easy insertion and removal. The electrical connection to the precipitator module 30 occurs through sliding contacts. The function performed by the precipitator module 30 is extremely important and greatly prolongs the functional life of the filter module 28. The precipitator module 30 removes the particulates from the air which would otherwise appear as smoke or haze as the air exits from cabinet 12. By removing the pariculates from the air, the precipitator module 30 eliminates the smoke or haze and by removing the particulates from the air prior to the air passing through the filter module 28, the particulates are prevented from covering the surface area of the charcoal particles and thereby preventing operation of the filter module 28 with the resulting requirement to replace the filter module 28. The more efficient the operation of the precipitator module 30, the more efficient the operation of the filter module 28 since the surface area of the charcoal particles will remain clean and not clogged with particulates. A basic objective in the design of the food frying and dispensing apparatus 10 was to provide a small compact unit which could be installed on a counter or table top. In designing the precipitator module 30, small size and high efficiency were conflicting requirements. To solve this conflict, the precipitator was designed to be operated in a derated condition. The normal range of face velocity for a two stage penny-type precipitator is 400 to 600 feet per minute. The operating range of face velocity for the inventive precipitator module 30 is 80% or less than that of the normal design value thereby allowing the size of the overall precipitator to be small but yet operate at an efficiency which is much greater than the efficiency with which it would operate if it was operated at the rated condition. Ozone generator 29 is located downstream from filter module 28. The function of the ozone generator 29 is to oxide any particulate or gas molecules which escape through the precipitator module 30 and the filter module 28 thereby removing their odor content through enriched oxygen with which they will combine very easily and quickly. Also located in the upper portion of cabinet 12 and positioned below the precipatator module 30, are three switch-type assemblies designated as interlock assembly 32 and initialization or activation assemblies 34 and 36. Interlock assembly 32 is activated by the removal of upper cabinet cover 14 and the activation thereof removes the electrical power from the various units and modules within cabinet 12. Initialization or activation assemblies 34 and 36 are activated by the movement of the food handling apparatus 124 and 126, respectively and will be discussed later. Fire extinguisher 37 is attached to cabinet 12 and is automatically activated in case of a fire in the cabinet 12 by sensor 35. The outlet of fire extinguisher 37 together with sensor 35 are positioned inside cabinet 12.

The second general area of the food frying and dispensing apparatus 10 can be considered as the food handling and frying area and is located within the lower portion of cabinet 12 behind cabinet door 16. Within this area is included a container or vat 38 which holds the proper amount of cooking oil for the food frying process. The unique configuration of the container or vat 38 is designed and sized (1) such that with predictable consumer use, the turnover of the cooking oil itself will be such as to not require the oil to be completely drained out and replaced except as would otherwise be dictated by consumer taste and (2) to minimize the amount of cooking oil required to be maintained in the container or vat 38 in order to simultaneously cook or fry successive batches of food products introduced into the cooking oil by the food handling apparatus 124 and 126. By minimizing the amount of cooking oil in container or vat 38, the BTU requirements for the heating element 44 are reduced to a minimum value with a resulting reduction in daily operating costs of the food frying and dispensing apparatus 10 since the major item of operating costs is the electricity to heat the cooking oil.

With reference to FIGS. 2-4, the front wall 40 and rear wall 42 of vat 38 generally form a V in shape with trough 44 formed at the bottom thereof. Font wall 40 forms an angle b with the horizontal of 50 to 60 degrees while rear wall 42 forms an angle a with the horizontal of 30 to 40 degrees. The shape of front wall 40 and rear wall 42, together with the shape and placement of heater element 90 with respect to rear wall 42 causes the oil 50 to circulate in a counterclockwise direction generally as shown in FIG. 3 by line c. The oil 50 sweeps generally up rear wall 42, across the top portion of oil 50, down front wall 40 and across the top of trough 44. The vat 38 is designed to help create convection currents of oil 50 past the heater element 90 and across the top of trough 44 and to reduce the total amount of oil 50 needed and thereby reduce the necessary power consumption to heat the oil 50. Any small bits or pieces of food products gravitate toward trough 44 and fall into dipper 46 which may be lifted out of vat 38 by handle 48 at periodic intervals and the bits or pieces of food products thrown away so they will not contaminate the oil 50 in vat 38. Trough 44 comprises a cold zone in which the temperature of the oil 50 in the cold zone or trough 44 is lower by up to 100 degrees than the temperature of the prime cooking zone above trough 44. The lower temperature in the cold zone avoids accelerated degradation of the oil 50 by not continually cooking the debris held in the cold zone. If the bits and pieces of food product were allowed to remain in the oil 50 at the prime cooking zone temperature, then accelerated degradation of the oil 50 would occur. Dipper 46 extends across the full width of vat 38. Mark 56 on the handle 48 of dipper 46 provides an indication of the correct oil level for vat 38. At the end of each day of operation of the food frying and dispensing apparatus 10, the operator checks the level of oil 50 in vat 38 relative to mark 58. If insufficient food products have been fried during the day to bring the level of oil 50 down to or below mark 58, then the operator removes sufficient oil 50 to bring the level down to mark 58. Then the operator adds enough fresh oil 50 to bring the level back up to mark 56. Side walls 60 and 62 of vat 38 extend upwardly to near the top of the lower portion of cabinet 12 and include a rolled edge 64 and 66 which are inserted in channels 68 which are attached to cabinet 12 and support vat 38. In other words, vat 38 hangs from and is supported by channels 68. Valve 52 attached to vat 38 allows the oil 50 to be completely drained from vat 38 if and whenever necessary. Handle 54 attached to the front wall 40 of vat 38 provides assistance to the operator in sliding the vat 38 out of cabinet 12 on channels 68 if and whenever necessary.

Heater assembly 70 provides the means for maintaining the temperature of the cooking oil 50 in the proper temperature range and is removably mounted, for pivotal movement, against the back wall of cabinet 12 by mounting means 72. Mounting means 72 include brackets 74 and 76 attached to cabinet 12, pins 78 and 80 projecting from heater assembly 70 and resting in channels 82 and 84 of brackets 74 and 76 respectively. Bracket 86 extends from heater assembly 70 and rests against the upper edge 88 of rear wall 42 for additional support. Heater assembly 70 includes heater element 90, temperature control assembly 92, over-temperature control assembly 94 and low-oil sensing assembly 96. Temperature control assembly 92 is the temperature control switch and switches the heating element 90 on and off to maintain the temperature of the cooking oil 50 within a predetermined temperature range. Over-temperature control assembly 94 senses when the temperature of the cooking oil 50 reaches a predetermined high value, which is considered too high, and as a safety feature inactivates or breaks the application of primary power to the food frying and dispensing apparatus 10. Assembly 94 provides a safety function by not allowing the cooking oil 50 to be heated above a predetermined temperature, above which the heated oil 50 could more easily cause a fire. Low-oil sensing assembly 96 provides an indication of a low level of cooking oil 50 and is positioned at a predetermined height in vat 38. If the hot oil level falls below the position of assembly 96, then assembly 96 cools below a predetermined value and activates a buzzer to indicate to the operator or proprietor that a problem exists. Also at this time, assembly 96 turns off all lights on status panel 114 and the light (not shown) on the rear of cabinet 12 to indicate to the user or operator that the oil level is low or that the oil temperature is low.

Oil shield 98 is positioned between precipitator module 30 and vat 38 as shown generally in FIG. 4. Edges 100 and 102 are positioned against the side walls of cabinet 12 above channels 68. Oil shield 98 comprises a sheet of metal which extends in depth at least as great as the depth of precipatitor module 30 and is to prevent any cooking oil, which drips from precipitator module 30, from dropping back into vat 38 and contaminate the oil 50. The oil shield 98 directs any oil droppings over to channels 68 which are sloped such that any oil 50 therein flows to the end of the channels 68 and drips down into the drip tray 104 (See FIG. 1) which rests on the bottom of cabinet 12 and can be slid out of cabinet 12 for cleaning oil drippings therefrom.

As mentioned previously, lower cabinet door 16 is pivotable about bolts or screws 20 and front panel 22 includes a base member 110 formed of metal and a wire support 112 extending above base member 110 and formed to provide two areas to hold and support cup-type containers (not shown) into which the fried food will be dispersed from the interior of the food frying and dispensing apparatus 10. Located below the lower cabinet door 16 is the front portion of drip tray 104. Drip tray 104 extends the length of cabinet 12 and is slidably mounted on the bottom surface of cabinet 12. As the name implies, drip tray 104 is provided to catch and hold any cooking oil 50 which is on the inside of food frying apparatus 10 but is not within the confines of container or vat 38. Drip tray 104 is slid forwardly from cabinet 12 and the oil cleaned therefrom. Front panel 22 also includes status panel 114 whose front surface is flush with the front surface of panel 22. Lights 116, 118 and 120 are associated with the lid assembly 122 and the food handling apparatus 124 associated therewith. Light 116 is a green light and when "on" indicates "ready." Light 118 is yellow and when "on" indicates "cook." Light 120 is red and when "on" indicates "dispense." Speaker 128 is positioned above lights 116, 118 and 120. Lights 130, 132 and 134 are the same as lights 116, 118 and 120 respectively but are associated with the lid assembly 136 and the other food handling apparatus 126 associated therewith. Speaker 138 is positioned above lights 130, 132 and 134. In the event additional food handling apparatus are incorporated, similar lights will be added for each food handling apparatus.

With reference to FIGS. 5 and 6, separate food handling apparatus 124 and 126 are shown in the "cook" position. Food handling apparatus 124 and 126 are separate and operate independent of each other, thereby allowing different customers to cook portions of french fry potatoes at the same time or allow one customer to cook different food items at the same time, such as potatoes and chicken. Food handling apparatus 126 includes actvivating mechanism 140 to cause pivotal movement of cooking basket 142. Cooking basket 142 comprises a generally rectangular shaped (in profile) container of rod-like material with the rod-like material arranged to form a reticulated construction which contains and holds the food product but allows the oil 50 in vat 38 to remain in vat 38. The spacing between the rod-like elements is 3/16 inches or less. Activating mechanism 140 comprises lid assembly 136, chute assembly 144, adjustable link 146, mount assembly 148, L-shaped bracket 150 and support assembly 152. Food handling apparatus 124 includes activating mechanism 154 to cause pivotal movement of cook basket 156. Since food handling apparatus 124, as well as any additional food handling apparatus, is essentially a duplicate of food handling apparatus 126 only food handling apparatus 126 will be discussed to avoid repetition. Lid assembly 136 includes pivotal lid portion 160 and nonpivotal lid portion 162 both of which are attached to bars 164 by pin 166. Lid portion 162 includes rod 168. Knob 170 is attached to lid portion 160 to assist the user in lifting lid portion 160 in a pivotal motion to expose aperture 172 in top surface 174 of lower cabinet door 16. Indicators in the form of lables are positioned on the top surface 174 of lower cabinet door 16 to indicate the "dispense" position, the "ready" position and the "cook" position of the food handling apparatus 126.

The indicators are referenced to the front edge of pivotal lid portion 160. In the "cook" position, chute assembly 144 is operatively positioned with respect to aperture 172 such that chute assembly 144 will guide any food introduced into aperture 172 down into cooking basket 142 and into the cooking oil 50 in container or vat 38. Pivotable flap 176 is attached to chute assembly 144 by pin 178 and prevents the food from overshooting and missing cooking basket 142. Bars 164 are attached at right angle to bars 180 which in turn are attached to chute assembly 144. Two rollers 182 are attached to each bar 180 and ride in a right angle guide bracket 184 positioned on opposite sides of chute assembly 144. One end of adjustable link 146 is attached to mount assembly 148 for pivotal movement with respect thereto by pin 186. Bolt 202 through aperture 204 allows length of link 146 to be adjusted. Mount assembly 148 is attached to chute assembly 144 by conventional means such as welding. The opposite end of adjustable link 146 is attached to L-shaped bracket 150 for pivotal movement with respect thereto by pin 188. L-shaped bracket 150 is attached to cooking basket 142 by convential means such as welding and is attached to support assembly 152 for pivotal movement with respect thereto by pin 190. Also attached to support assembly 152 is discharge chute 192 whose exit opening is operatively aligned with funnel 194. Support assembly 152 is attached to mounting bracket 196 by pin 198 with mounting bracket 196 being attached to back panel 200 of recess 106 by conventional means such as welding. Bars 206, 207 and 208, 209 are attached to baskets 142 and 156 respectively. (Bar 208 is not shown.)

Figure 7:
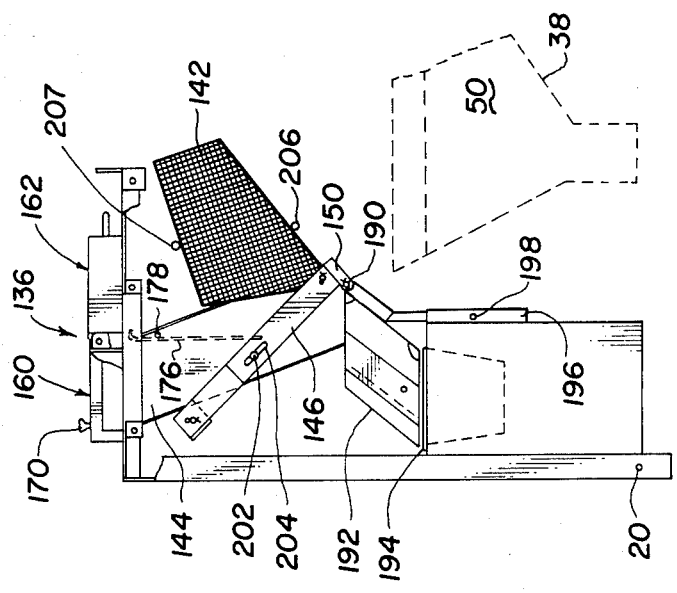
FIG. 7 is a simplified side elevational view of the food handling apparatus of the present invention in the dispense position.

With reference to FIG. 7, the food handling apparatus 126 is shown in the "dispense" position. This is the position of apparatus 126 when moved from the "cook" position to discharge the food product from the cooking basket 142, down discharge chute 192, through funnel 194 and into the container (not shown) placed on support apparatus 108 beneath funnel 194. As will be appreciated, lid assembly 136 has been moved to the left or toward the front panel of lower cabinet door 16 from its position in FIG. 5. The movement of the lid assembly 136 to the left causes lateral movement to the left of chute assembly 144, mount assembly 148, pin 186 and the upper end of adjustable link 146 which results in rotational movement of L-shaped bracket 150 due to the movement of adjustable link 146. As L-shaped bracket 150 rotates counterclockwise about pin 190, cooking basket 142 follows and also rotates counterclockwise until edge 219 of cooking basket 142 strikes edge 220 of chute assembly 144. The jar which occurs when edge 219 of cooking basket 142 strikes edge 220 of chute assembly 144 assures that all the french fries will be discharged from cooking basket, down discharge chute 192, through funnel 194 and into the container (not shown) placed under funnel 194 by the user. The length of adjustable link 46 is adjusted such that edge 219 contacts edge 220 when lid assembly 136 is at its maximum travel to the left.

With reference to FIG. 8, the food handling apparatus 126 is shown in the "ready" position. This is the position which the food handling apparatus 126 assumes after the lid assembly 136 has been moved to the left to discharge the french fries from the cooking basket 142 and when the lid assembly 136 has been released by the customer. The weight of the cooking basket 136 causes the lid assembly 136 to move to the right until pivotal stop 210 contacts wall 212 which protrudes upwardly from the top surface 174 of lower cabinet door 16 (See FIG. 9). This "ready" position is the position of the food handling apparatus 126 when not being used. The cooking basket 142 is positioned out of the hot cooking oil, which prolongs the usable life of the cooking oil 50.

Figure 9:
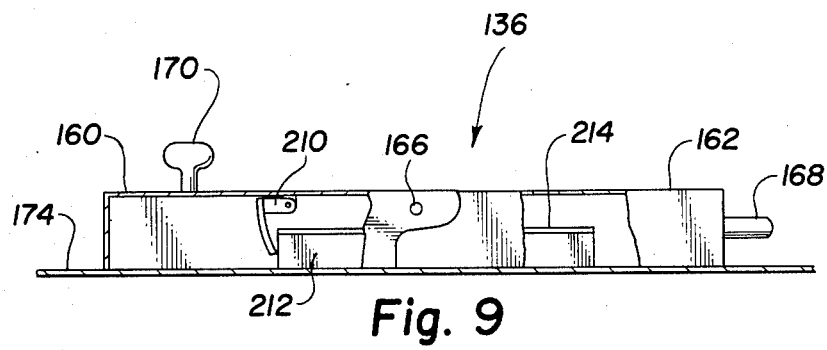
FIG. 9 is a simplified side elevational view of a portion of the lid assembly of the present invention with portions thereof cutaway.
Figure 10:
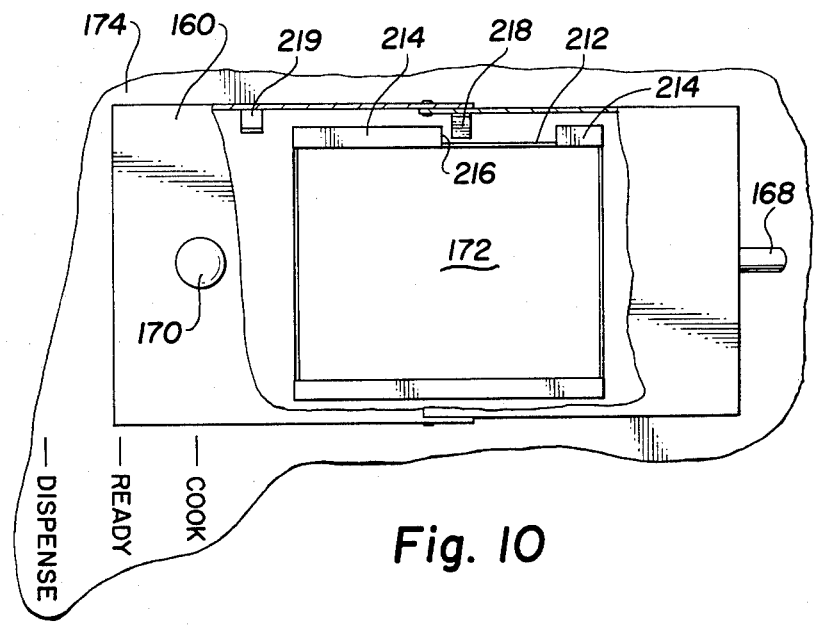
FIG. 10 is a simplified top plan view of a portion of the lid assembly with portions thereof cutaway.
Figure 13:
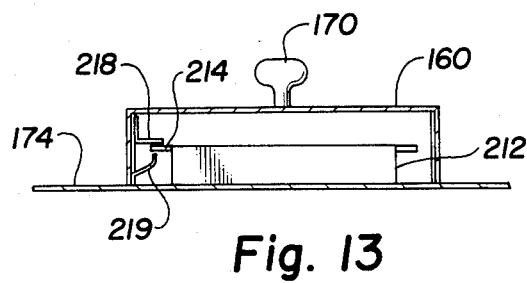
FIG. 13 is a simplified and elevational view of a portion of the lid assembly of the present invention with portions thereof cutaway.

With reference to FIGS. 9 and 10, lid assembly 136 is shown in the "ready" position with its rearward (to the right)movement stopped by the interaction of pivotal stop 210 with wall 212 rising from top surface 174 of lower cabinet door 16. Pivotal stop 210 is configured and located such that it is capable of pivoting in counterclockwise rotation only. Bracket 218 is attached to and protrudes from the sidewall of pivotal lid portion 160 at a location to the rear of pin 166. Bracket 218 protrudes above flange 214 (See FIG. 13). In the ready position, bracket 218 is aligned with cutout 216. Spring clip retainer 219 is also attached to and protrudes from the sidewall of pivotal lid portion 160. Spring clip retainer 219 protrudes below flange 214 (See FIG. 13). In the ready position, psring clip retainer 219 is positioned forward of flange 214. In the ready position, with bracket 218 positioned in alignment with cutout 216 in flange 214 and spring clip retainer 219 positioned forward of flange 214, pivotal lid portion 160 may be pivoted upwardly from the position shown in FIG. 9. This pivotal movement raises pivotal stop 210 above the top edge of wall 212 and the lid assembly 136 together with activating mechanism 140 moves to the "cook" position.

Figure 11:
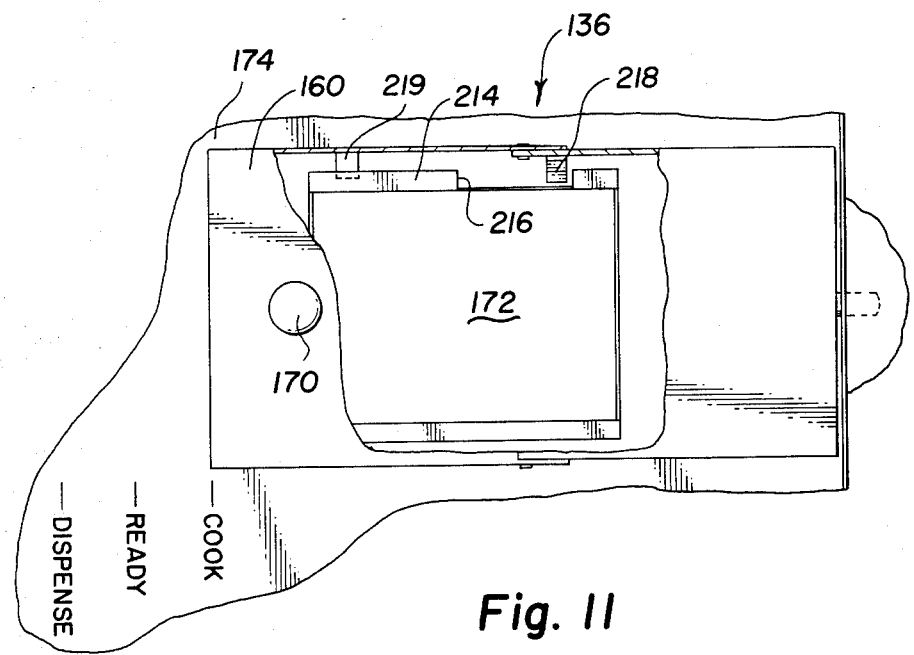
FIG. 11 is a simplified top plan view of a portion of the lid assembly of the present invention in a second position with portrions thereof cutaway.

With reference to FIG. 11, when pivotaL lid portion 160 is lowered, spring clip retainer 219 is compressed toward the sidewall of pivotal lid portion 160 until it passes below flange 214 at which time it springs back away from the sidewall to rest under flange 214 and prevent the pivotal lid portion 160 from being raised upwardly while in the "cook" position.

Figure 12:
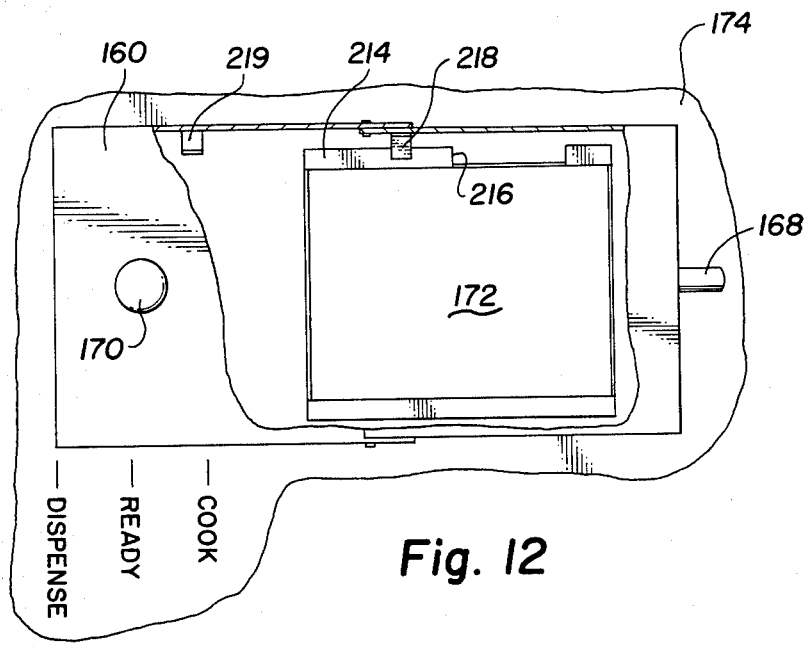
FIG. 12 is a simplified top view of a portion of the lid assembly of the present invention in a third position with portions thereof cutaway.

With reference to FIG. 12, after the food product has been cooked, lid assembly 136 together with activating mechasism 140 is moved to the "dispense" position to dispense or discharge the cooked food product from apparatus 10. Spring clip retainer 219 is again positioned forwad of flange 214 but bracket 218 is positioned above flange 214 and is not in alignment with cutout 216; therefore, pivotal lid portion 160 cannot be moved or pivoted upwardly. If lid portion 160 is attempted to be opened upwardly, bracket 218 contacts the top of flange 214. Pivotal lid portion 160 may only be pivoted upwardly to the open position when lid assembly 136 is in the "ready" position.

Figure 22:
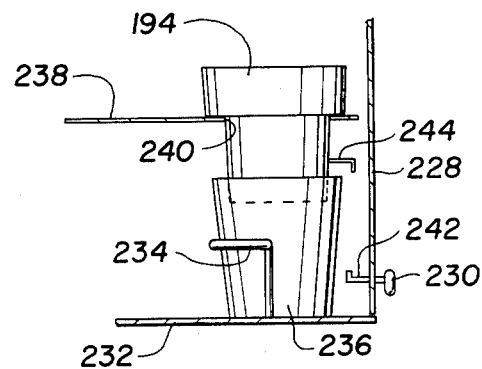
FIG. 22 is a simplified side elevational view of a portion of the food collection station according to the present invention.

A typical day in the operation of the food frying and dispensing apparatus 10 begins with the turning on of the main power to the apparatus which activates the fan assembly 24, the ozone generator 29, the precipatator module 30 and the heater assembly 70. Since the cooking oil 50 is not up to operating temperature the low oil sensing assembly 96 activates the buzzer (not shown) to provide an audible indication that the apparatus 10 is not ready to be used. When the cooking oil 50 reaches operating temperature, the buzzer (not shown) will shut off and "ready" lights 116 and 130 will light on the front panel of apparatus 10. A light (not shown) on the back of cabinet 12 will also be energized to indicate that the oil 50 is at the operating temperature and ready to cook the food product. If during the warm-up period of apparatus 10, the noise of the buzzer becomes annoying there is a switch on the back of cabinet 12 to disable the buzzer during the warm-up period. The food products, which include potatoes, chicken, fish, etc., are kept in separate containers in a cold storage area and the user goes to the cold storage area and selects a container or containers of the particular food product of his choice and goes to the food frying and dispensing apparatus 10. The user finds the apparatus 10 in the "ready" position as shown in FIG. 8 and he proceeds to lift up the pivotal lid portion 160 of lid assembly 136. This raises pivotal stop 210 over the edge of wall 212 and the lid assembly 136 together with activating mechanism 140 move away from the user to the cook position (See FIG. 5) with the cooking basket 142 positioned in the cooking oil 50. The pivotal lid portion 160 is now in alignment with aperture 172 and the user discharges the food product from its container into aperture 172. The food product gravitates down chute assembly 144 into cooking basket 142 which is immersed in hot cooking oil 50. Rod 168 contacts and activates initialization or activation assembly 36 which initiates a timer, turns off as the "ready" light 130 and turns on the "cook" light 132. When the timer times-out, the buzzer sounds through speaker 138 (for a predetermined time), the "cook" light 132 goes out and the "dispense" light 134 is turned on. If the user has temporarily left the apparatus 10, the buzzer and the "dispense" light 134 provide indications to the user that the cooking of the food product has been completed and it is time to dispense the food product from the apparatus 10. The user then places his hand on knob 170 and pulls lid assembly 136 towards him as far as possible which places the food handling apparatus 126 in the "dispense" position as shown in FIG. 7. Cooking basket 142 rotates counterclockwise up and out of the oil vat 38 and edge 219 of cooking basket 142 hits edge 220 of chute assembly 144 to assure discharge of all of the food product in cooking basket 142 and help to shake any oil 50 on the wires of the cooking basket 142 back into vat 38. The food product gravitates down discharge chute 192, through funnel 194 and into the container 236 (see FIG. 22) which housed the food product prior to the food product being placed into apparatus 10 and which has been placed under funnel 194 by the user after food product was discharged into apparatus 10. The user releases the knob 170 on the pivotal lid portion 160 and the food handling apparatus 126 goes to the "ready" position because of the weight and leverage applied by the cooking basket 142. As an alternative method to dispense the cooked food product, the user may first pull the lid assembly 136 toward him only far enough to place the front edge of pivotal lid portion 160 on the "ready" position indicator, hold the lid assembly 136 at that location for a predetermined period of time and then move the lid assembly 136 to the "dispense" position. The waiting period at the ready position allows more oil 50 to drain from the food product with the user obtaining a less oil product. Some of the oil 50 which might remain on the various wires comprising the cooking basket 142 contact bars 206 and 207 and drop back into vat 38. Oil 50 which manages to gravitate down to edge 219 falls through cut out 222 on the upper edge of discharge chute 192 and down into drip tray 104 positioned therebelow in the bottom of cabinet 12. Any oil 50 which is deposited on the surface of discharge chute 192, by the food product, falls through cutout 224 in the lower edge of discharge chute 192 and onto the top surface 226 of recess 106, whereupon the oil 50 flows down the back panel 200 into the drip tray 104.

The food handling apparatus 126 is now ready to be used again to fry and cook another container of a food product. It will be appreciated that a user can simultaneously use one or more food handling apparatus such as food handling apparatus 126 and 124 to fry different portions of food products. Also, different users can use different food handling apparatus (one user uses 124 and the other user uses 126) to simultaneously prepare their own separate portions of a food product.

During operation of the food frying and dispensing apparatus 10, fan assembly 24 is drawing air into the cabinet 12 through the front of cabinet 12 where drip tray 104 enters cabinet 12. The air is drawn around and across vat 38 (where smoke and fumes from the hot oil 50 are drawn into the air stream), up through the precipatator module 30 where the particulates are removed, up through the filter module 28 where the odors are removed from the air and fragance is added, by the ozone generator 29 where ozone is injected into the air stream which is then discharged out aperture 26.

In the performance of daily maintenance, screws 18 which holds the lower cabinet door 16 are removed and door 16 is pivoted downwardly to the position shown in FIG. 2. The level of the oil 50 in vat 38 is checked using the marks 56 and 58 and oil 50 is removed, if necessary, to bring the oil level down to mark 58. New oil 50 is added to bring the oil level up to mark 56. During this time, the fan assembly 24, together with the other units behind upper cabinet cover 14, are operating to process the smoke and fumes associated with the hot oil 50 in vat 38 so the smoke and fumes will not escape into the room.

Figure 14:
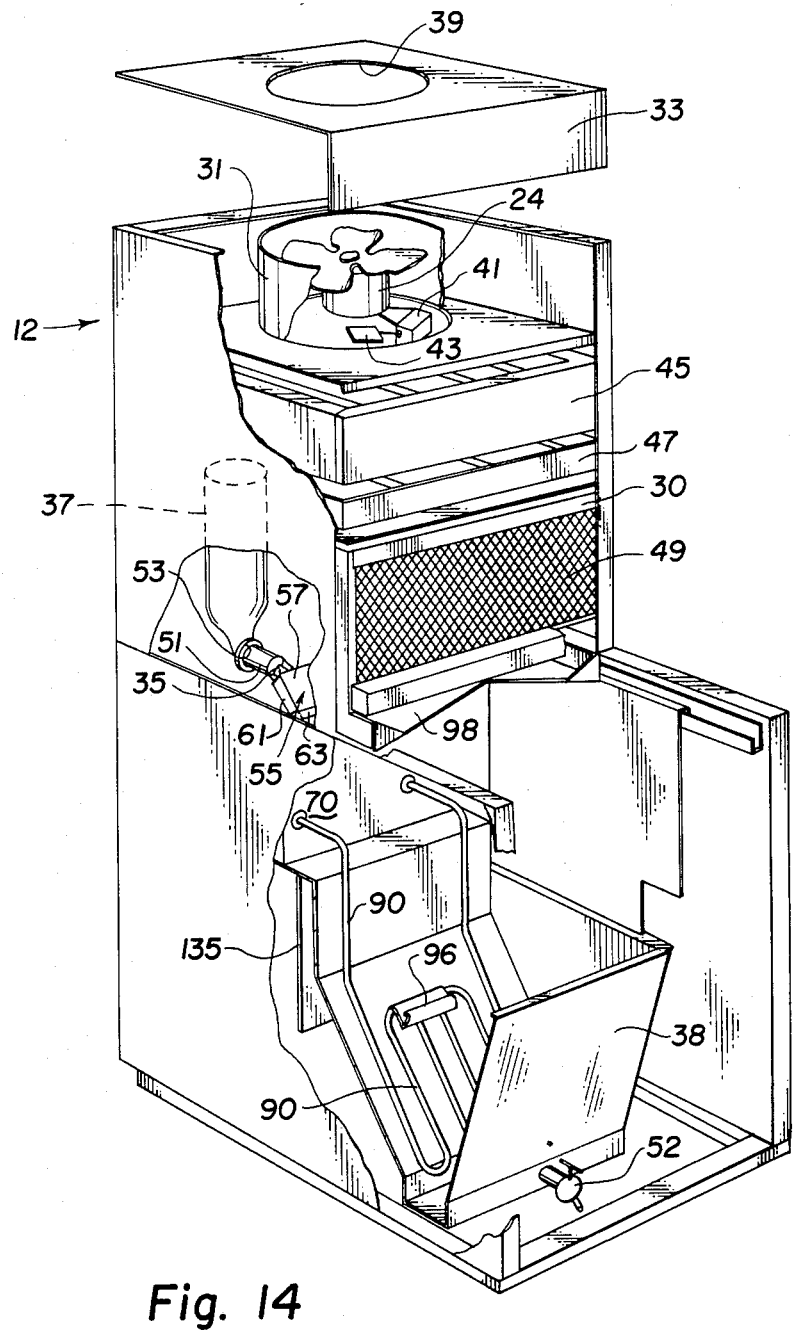
FIG. 14 is a simplifed perspective view of an alternate embodiment of the food frying and dispensing apparatus according to the present invention with portions of the cabinet being displaced to expose apparatus to view.

Referring now to FIG. 14, an alternate embodiment of the food frying and dispensing apparatus 10 is disclosed. The only differences between the two embodiments occur in the first area or the air-cleaning area and the apparatus to move and clean the air and which are located within the upper portion of cabinet 12 behind upper cabinet cover 14.

This air-cleaning area and the apparatus to move and clean the air are located within the upper portion of cabinet 12 behind upper cabinet cover 14 and includes fan assembly 24 which, in the preferred embodiment, is positioned uppermost in cabinet 12. Shield 31, surrounding fan assembly 24, together with baffle 33, tend to direct and concentrate the flow of air through the upper portion of cabinet 12 and to increase the efficieny of fan assembly 24. Aperture 39 in baffle 33 is coaxial with shield 31 and has substantially the same diameter as shield 31. Sail switch 41 with actuating sail 43 is positioned near the lower portion of fan assembly 24 with the actuating sail 43 being positioned in the air stream such that actuating sail 43 will be raised upwardly by the flow of air to actuate or turn "on" sail switch 41. If the air is not flowing, then actuating sail 43 will be in a down position and will turn "off" sail switch 41. Sail switch 41 is in electrical series with heating element 90 and the low voltage power supply such that if the flow of air through the cabinet 12 ceases, then the heating element 90 will be turned off for safety reasons and the low voltage power supply will be inactivated so the food frying and dispensing apparatus 10 cannot be operated by a customer.

Filter module 45 is mounted below and upstream of fan assembly 24. In the preferred embodiment, filter module 45 is slidably mounted within cabinet 12 for easy and quick insertion and removal. Filter module 45 comprises activated charcoal elments or particles packaged in a unique structure which provides a greater area of surface contact with the air flowing through the filter module 45 for a given cross-sectional area of the upper portion of cabinet 12. The structure of filter module 45 will be discussed below. The activated charcoal elements or particles will remove 99% of the oil odors and the cooking odors from the air which exits from the food frying and dispensing apparatus 10.

Flame arrester 47 is mounted below and upstream of filter module 45. In the preferred embodiment, flame arrester 47 is slidably mounted within cabinet 12 for easy and quick insertion and removal. In the event a fire does occurs in the lower portion of cabinet 12, such as an oil fire, flame arrester 47 prevents the flames from passing upwardly into the filter module 45 and catching the filter module 45 on fire and also prevents the flames from passing on to the fan assembly 24 and out aperture 26. The structure of flame arrester 47 will be discussed below.

Precipitator module 30 comprises a two stage pennytype precipitator and is located below and upstream of filter module 45 in cabinet 12 and in the preferred embodiment is slidably mounted therein for easy insertion and removal. The electrical connection to the precipitator module 30 occurs through sliding contacts. The function performed by the precipitator module 30 is extremely important and greatly prolongs the functional life of the filter module 45. The precipitator module 30 removes the particulates from the air which would otherwise appear as smoke or haze as the air exists from cabinet 12. By removing the particulates from the air, the precipitator module 30 eliminates the smoke or haze and by removing the particulates from the air prior to the air passing through the filter module 45, the particulates are prevented from covering the surface area of the activated charcoal elements or particles and thereby preventing operation of the filter module 45 with the resulting requirement to replace the filter module 45. The more efficient the operation of the precipitator module 30, the more efficient the operation of the filter module 45 since the surface area of the activated charcoal elements or particles will remain clean and not clogged with particulates. A basic objective in the design of the food frying and dispensing apparatus 10 was to provide a small compact unit which could be installed on a counter or table top. In designing the precipitator module 30, small size and high efficiency were conflicting requirements. To solve this conflict, the precipitator was designed to be operated in a derated condition. The normal range of face velocity for a two stage penny-type precipitator is 400 to 600 feet per minute. The operating range of face velocity for the inventive precipitator module 30 is 80% or less than that of the normal design value thereby allowing the size of the overall precipitator to be small but yet operate at an efficiency which is much greater than the efficiency with which it would operate if it was operated at the rated condition.

To provide additional safety to the operator or maintenance personnel, a mesh protection guard 49 is provided across the front and bottom of precipitator module 30. Since high DC voltage is applied to precipitator module 30 during the operation thereof, mesh protection guard 49 prevents the operator or maintenance personnel from accidently coming in contact with the high DC voltage applied to precipitator module 30.

Figure 20:
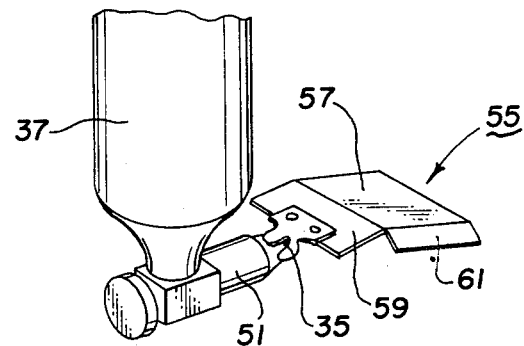
FIG. 20 is a simplified perspective view of the fire extinguisher and deflection shield according to the present invention.
Figure 21:
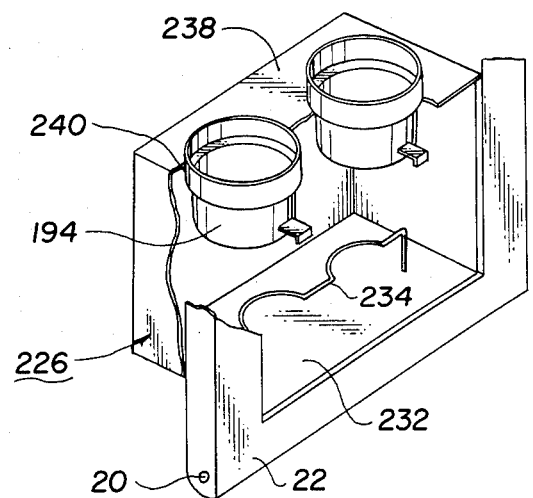
FIG. 21 is a simplified perspective view of the food collection station according to the present invention.

Fire extingusher 37 is attached to the back of the upper portion of cabinet 12 with the nozzle or outlet 51 and sensor 35 being positioned inside cabinet 12 through aperture 53. Means for directing and concentrating the expelled contents of fire extinguisher 37 downwardly onto container 38 is provided in the form of deflection shield 55 attached to nozzle or outlet 51. With reference to FIGS. 14 and 20, deflection shield 55 comprises a main body portion 57 which is generally flat and rectangular in shape and lies generally in a first plane. Formed as an extension of main body portion 57 or attached thereto are four generally rectangular pieces 59–63 (only three of which are shown) which extend from the plane of main body portion 57 at predetermined angles. In the disclosed embodiment, the predetermined angles are approximately 45 degrees. Rectangular piece 59 is attached by conventional means to sensor 35. Fire extinguisher 37 is automatically activated by sensor 35 when a fire is sensed by sensor 35 in cabinet 12. Contacts in sensor 35 are also connected in electrical series with the primary power into the food frying and dispensing apparatus 10 such that primary power (220 volts) in removed from the food frying and dispensing apparatus 10 when sensor 35 senses a fire.

Flat panel 135 is an extension of upper edge 88 and is generally parallel to the rear wall of cabinet 12 and prevents the wiring (not shown) going to heater assembly 70 from contacting the rear wall 42 of container or vat 38, for safety purposes.

Figure 15:
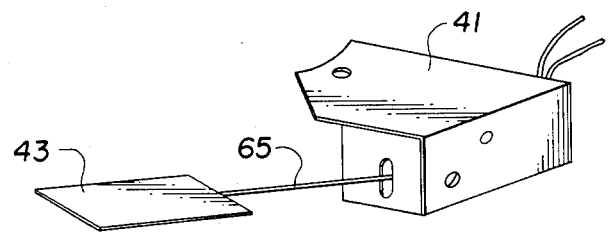
FIG. 15 is a simplified perspective view of the sail switch according to the present invention.

With reference to FIG. 15, sail switch 41 is disclosed with rod or arm 65 connecting actuating sail 43 to sail switch 41.

Figure 16:
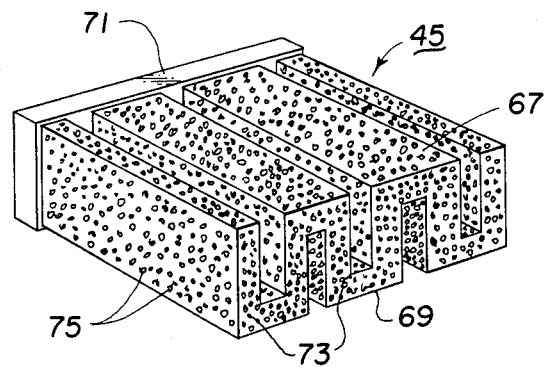
FIG. 16 is a simplified perspective view of the filter module according to the present invention.

With reference to FIG. 16, filter module 45 is disclosed. The structure of the filter module 45 may be considered as comprising an upper cover portion 67, a lower cover portion 69 positioned a predetermined distance from said upper cover portion 67 and two end portions 71 (only one shown) formed to contain and hold the activated charcoal elements or particles 73. Both upper cover portion 67 and lower cover portion 69 include holes or apertures 75 formed therethrough to allow the passage of air therethrough. Both the upper cover portion 67 and the lower cover portion 69 are serpentine-like in shape and as shown in operative position in FIG. 16 form succeeding U-shaped figures which are oriented 180 degrees from each other and share a common leg between succeeding U-shaped figures.

Figure 17:
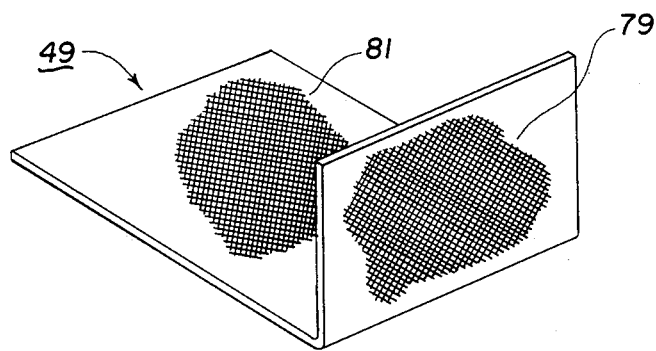
FIG. 17 is a simplified perspective view of the protection guard according to the present invention.

With reference to FIG. 17, mesh protection guard 77 is disclosed and comprises a front portion 79 and a lower portion 81 connected thereto at right angles. When in operative position with respect to the precipitator module 30, mesh protection guard 49 prevents the operator, etc. from physically contacting the front and lower portions of the precipitator module 30. The mesh protection guard 49 may be formed from heavy mesh or screen type material or from a solid material which then has a sufficient number of apertures or openings formed therein to allow a sufficient passage of air therethrough. Front portion 79 and lower portion 81 may be two separate pieces attached to the precipitator module 30 as two separate pieces or may be formed from two separate pieces which are connected together before being attached to the precipitator module 30 or the mesh protection guard 49 may be formed from a single piece of material.

Figure 18:
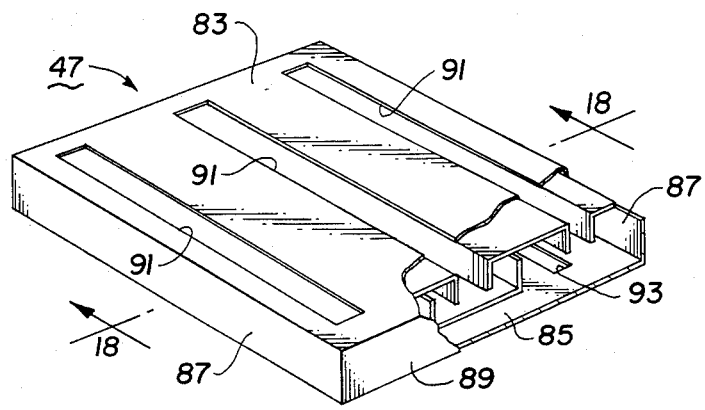
FIG. 18 is a simplified perspective view of the flame arrester according to the present invention.
Figure 19:
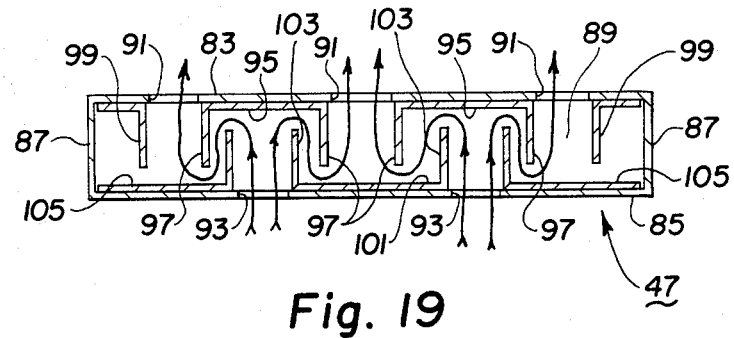
FIG. 19 is a simplified sectional view of the flame arrestor according to the present invention as taken along lines 18—18 in FIG. 18.

With reference to FIGS. 18 and 19, flame arrester 49 is disclosed and comprises an upper portion 83, a lower portion 85, two side portions 87 connected between the side edges of the upper portion 83 and the lower portion 85, and two end portions 89 connected between the end edges of the upper portion 83 and the lower portion 85.

In the disclosed embodiment, upper portion 83 has three elongated apertures 91 formed therein which are spaced apart a predetermined distance. Lower portion 85 has two elongated apertures 93 formed therein which are spaced apart a predetermined distance and are aligned, with respect to elongated apertures 91, such that each elongated aperture 93 is generally centered between two elongated apertures 91. Attached to the inside surface of upper portion 83 are two U-shaped channel elements 95 with one U-shaped channel element 95 being positioned midway between each two succeeding elongated apertures 91 and centered opposite an elongated apertures 93. The top portions 97 of the U-shaped channel elements 95 are directed toward lower portion 85. Positioned outboard of the elongated apertures 95 are angle irons 99 which are attached to upper portion 83.

Attached to the inside surface of lower portion 85 is a U-shaped channel element 101 which is positioned midway between elongated apertures 93 and opposite elongated aperture 91 (which is positioned in the central area of upper portion 83). The top portions 103 of Ushaped channel element 101 are directed toward upper portion 83. Positioned outboard of each elongated aperture 67 is an angle iron 105 which is attached to lower portion 85. It will be appreciated that flame arrester 47 could include a greater number or a lesser number of apertures and U-shaped channel units without deviating from the disclosed concept. It will be appreciated that flame arrester 47 provides means for preventing or at least greatly reducing the possibility of filter module 45 catching on fire because of a fire located in the lower portion of the cabinet 12. Flames cannot easily and straightforwardly reach filter module 45 since any flames must enter elongated aperture 93, impinge against U-shaped channel elements 95, change direction 90 degrees and impinge against top portions 97, change direction 90 degrees and impinge against angle irons 105 and change direction 180 degrees to exit through elongated apertures 91.

Food collection station or box 226 is attached to and supported by front panel 22 and includes a front door 228 which is mounted for sliding movement in the up and down directions. Knob or handle 230 provides an easy means for the customer to grasp and slide the front door 228. Inside the food collection station or box 226 and supported by floor 232 is wire support 234 for providing support to cup or containers 236 into which the cooked food is deposited. In the top 238 of food collection station or box 226 is located aperture 240 into which funnel 194 is operatively positioned for slidable movement therewithin. With the front door 228 in the down position, the lower portion of funnel 194 rests down inside the top portion of cup or container 236 to prevent food from being deposited outside the cup or container 236. When the front door 228 is raised by the customer to retrieve the cup or container 236 containing the cooked food, latch 242 (which is attached to the inside of front door 228) contacts bar 244 on funnel 194 and slides funnel 194 upwardly in aperture 240 so that cup or container 236 may be easily removed from the food collection station or box 226.

All materials used in the construction of the food frying and dispensing apparatus 10 is of such a nature and composition as to be non-toxic to the food product handled and to be compatible with continued contact with the food products where applicable.

It will be appreciated that the invention provides apparatus for quickly cooking a food product in a short period of time which can be operated easily and safely by a user. Various means are provided for effectively eliminating any discharge of smoke or odor from the apparatus during its operation. The design of the container for the cooking oil together with the operation of the apparatus assures a minimum contamination of the cooking oil which results in a maximum usable life of the cooking oil. Means are provided to assure that the oil remains internal to the apparatus.

Thus, it is apparent that there has been provided in accordance with this invention, a food frying and dispensing apparatus that substantially incorporates the advantages that set forth above. Although the present invention has been described in conjunction with specific forms thereof, it is evident that many alternatives, modifications, and variations will be apparent to those skilled in the art in light of the foregoing disclosure. Accordingly, this description is to be construed as illustrative only and is for the purpose of teaching those skilled in the art the manner of carrying out the invention. It is understood that the forms of the invention herewith shown and described are to be taken as the presently preferred embodiments. Various changes may be made in the shape, size and arrangement of parts. For example, equivalent elements may be substituted for those illustrated and described herein, parts may be reversed, and certain features of the invention may be utilized independently of other features of the invention. It will be appreciated that various modifications, alternatives, variations, etc. may be made without departing from the spirit and scope of the invention as defined in the appended claims.

We claim:

1. Apparatus for cooking and dispensing various food products, said apparatus comprising:
    a container for holding a supply of cooking oil;
    means for maintaining the temperature of said cooking oil sufficiently high for cooking successive batches of food products;
    means for supporting the food product in the cooking oil during the cooking thereof;
    means for depositing the food product into said supporting means by a consumer;
    means for discharging the food product from said supporting means;
    blower means for circulating air through the apparatus along a predetermined path and exiting at a predetermined location; and
    a charcoal filter positioned in said predetermined air path, said charcoal filter comprising an upper portion of serpentine shape forming a succession of hills and valleys, a lower portion of serpentine shape forming a succession of hills and valleys, said lower portion being positioned in mating relationship with said upper portion and a predetermined distance therefrom, side portions operatively connected between said upper portion and said lower portion, around the periphery thereof, to form a volume therewithin, and charcoal particles contained within said volume.

2. The apparatus of claim 1 wherein the hills of said upper portion are greater in width than the valleys of said upper portion and the valleys of said lower portion are greater in width than the hills of said lower portion.

3. The apparatus of claim 1 further including fragrance elements positioned in said predetermined air path and downstream from said charcoal filter.

4. The apparatus of claim 1 further including a precipitator positioned in said predetermined air path and upstream from said blower means.

5. The apparatus of claim 4 further including a shield means opertively positioned between said container and said precipitator to prevent any cooking oil which collects on said precipitator from falling back into said container.

6. The apparatus of claim 1 further including a flame arrester positioned in predetermined air path and upstream from said charcoal filter.

7. The apparatus of claim 1 further including a fire extinguisher and associated sensor for automatically activating said fire extinguisher in the event of a fire in said apparatus, said fire extinguisher including a deflection shield mounted on said fire extinguisher to direct and concentrate the discharged contents of said fire extinguisher downwardly toward said container for holding a supply of cooking oil.

8. The apparatus of claim 1 further including a single means for sensing both the low oil level and the low oil temperature of the cooking oil in said container and providing an electrical indication thereof, said single means for sensing comprises a temperature sensitive device positioned at a predetermined location in said container such that said temperature sensitive device is covered by cooking oil when the cooking oil is above a predetermined and acceptable level, whereby said temperature sensitive device provides a predetermined electrical signal when the oil level drops such that the cooking oil does not cover said temperature sensitive device and said temperature sensitive device cools below a predetermined temperature or when the temperature of the cooking oil drops below a predetermined temperature even when the cooking oil is at a level which covers said temperature sensitive device.

9. The apparatus of claim 1 further including drip means attached to said means for supporting the food product to cause oil on said means for supporting the food product to fall back into said container when said means for supporting the food product is removed from said container, said drip means includes a separate bar member attached at a predetermined location on said means for supporting the food product.

10. Apparatus for cooking and dispensing various food products, said apparatus comprising:
    a container for holding a supply of cooking oil;
    means for maintaining the temperature of said cooking oil sufficiently high for cooking successive batches of food products;
    means for supporting the food product in the cooking oil during the cooking thereof;
    means for depositing the food product into said supporting means by a consumer;
    means for discharging the food product from said supporting means;
    blower means for circulating air through the apparatus along a predetermined path and exiting at a predetermined location; and
    switch means physically positioned in the predetermined path of circulating air and capable of being operated to an "on" condition by the circulating air, said switch means being operatively coupled with respect to said means for maintaining the temperature of said cooking oil such that said means for maintaining the temperature of said cooking oil will not function unless said switch means is in the "on" condition.

11. The apparatus of claim 10 further including fragrance elements positioned in said predetermined air path and upstream from said switch means.

12. The apparatus of claim 10 further including a precipitator positioned in said predetermined air path and upstream from said blower means.

13. The apparatus of claim 12 further including a shield means operatively positioned between said container and said precipitator to prevent any cooking oil which collects on said precipitator from falling back into said container.

14. The apparatus of claim 10 further including a flame arrester positioned in said predetermined air path and upstream from said switch means.

15. The apparatus of claim 10 further including a fire extinguisher and associated sensor for automatically activating said fire extinguisher in the event of a fire in said apparatus, said fire extinguisher including a deflection shield mounted on said fire extinguisher to direct and concentrate the discharged contents of said fire extinguisher downwardly toward said container for holding a supply of cooking oil.

16. The apparatus of claim 10 further including a single means for sensing both the low oil level and the low oil temperature of the cooking oil in said container and providing an electrical indication thereof, said single means for sensing comprises a temperature sensitive device positioned at a predetermined location in said container such that said temperature sensitive device is covered by cooking oil when the cooking oil is above a predetermined and acceptable level, whereby said temperature sensitive device provides a predetermined electrical signal when the oil level drops such that the cooking oil does not cover said temperature sensitive device and said temperature sensitive device cools below a predetermined temperature or when the temperature of the cooking oil drops below a predetermined temperature even when the cooking oil is at a level which covers said temperature sensitive device.

17. The apparatus of claim 10 further including drip means attached to said means for supporting the food product to cause oil on said means for supporting the food product to fall back into said container when said means for supporting the food product is removed from said container, said drip means includes a separate bar member attached at a predetermined location on said means for supporting the food product.

18. Apparatus for cooking and dispensing various food products, said apparatus comprising:
a container for holding a supply of cooking oil;
means for maintaining the temperature of said cooking oil sufficiently high for cooking successive batches of food products;
means for supporting the food product in the cooking oil during the cooking thereof;
means for depositing the food product into said supporting means by a consumer;
means for discharging the food product from said supporting means;
blower means for circulating air through the apparatus along a predetermined path and exiting at a predetermined location; and
a flame arrester positioned in said predetermined air path and upstream from said blower means, said flame arrester configured to prevent flames from traveling past said flame arrester toward said blower means.

19. The apparatus of claim 18 wherein said flame arrester comprises:
an upper portion lying generally in a first plane and including a predetermined number of apertures formed therein, said upper portion further including projections extending from a first side thereof with a projection being positioned on each side of each aperture;
a lower portion lying generally in a second plane, said second plane being generally parallel to said first plane, said lower portion including a predetermined number of apertures formed therein, said lower portion further including projections extending from a first side thereof with a projection being positioned on each side of each aperture, said first side of said lower portion facing said first side of said upper portion; and
side portions operatively connected between said upper portion and said lower portion, around the periphery thereof.

20. The apparatus of claim 18 further including fragrance elements positioned in said predetermined air path and upstream from said blower means.

21. The apparatus of claim 18 further including a precipitator positioned in said predetermined air path and upstream from said blower means.

22. The apparatus of claim 21 further including a shield means operatively positioned between said container and said precipitator to prevent any cooking oil which collects on said precipitator from falling back into said container.

23. The apparatus of claim 18 further including a fire extinguisher and associated sensor for automatically activating said fire extinguisher in the event of a fire in said apparatus, said fire extinguisher including a deflection shield mounted on said fire extinguisher to direct and concentrate the discharged contents of said fire extinguisher downwardly toward said container for holding a supply of cooking oil.

24. The apparatus of claim 18 further including a single means for sensing both the low oil level and the low oil temperature of the cooking oil in said container and providing an electrical indication thereof, said single means for sensing comprises a temperature sensitive device positioned at a predetermined location in said container such that said temperature sensitive device is covered by cooking oil when the cooking oil is above a predetermined and acceptable level, whereby said temperature sensitive device provides a predetermined electrical signal when the oil level drops such that the cooking oil does not cover said temperature sensitive device and said temperature sensitive device cools below a predetermined temperature or when the temperature of the cooking oil drops below a predetermined temperature even when the cooking oil is at a level which covers said temperature sensitive device.

25. The apparatus of claim 18 further including drip means attached to said means for supporting the food product to cause oil on said means for supporting the food product to fall back into said container when said means for supporting the food product is removed from said container, said drip means includes a separate bar member attached at a predetermined location on said means for supporting the food product.

26. Apparatus for cooking and dispensing various food products, said apparatus comprising:

a container for holding a supply of cooking oil;

means for maintaining the temperature of said cooking oil sufficiently high for cooking successive batches of food products;

means for supporting the food product in the cooking oil during the cooking thereof, said means for supporting the food product including at least one food container configured to hold the food product but allow the oil to remain in the container when the food container is removed therefrom; and activating mechanism operatively associated with said at least one food container to pivotally position said at least one food container in three separate and distinct positions, said three separate and distinct positions being in the oil in a "cook" position, out of the oil in a food product "dispense" position and out of the oil in a "ready" position, said activating mechanism includes lock means to lock the activating mechanism in the "ready" position to maintain said at least one food container in a position which is out of the cooking oil when the apparatus is not cooking a food product.

27. The apparatus of claim 26 wherein said activating mechanism includes a chute assembly and an adjustable link assembly operatively connected between said chute assembly and said at least one food container, whereby said adjustable link assembly is adjusted such that said at least one food container contacts said chute assembly when said activating mechanism is positioned to the "dispense" position.

28. The apparatus of claim 26 wherein said activating mechanism includes a lid assembly, a pivotal lid portion operatively attached to said lid assembly for pivotal movement with respect thereto and lock means operatively associated with said pivotal lid portion, said lock means being configured to prevent said pivotal lid portion from being pivoted upwardly while said activating mechanism is in any position except the "ready" position.

29. The apparatus of claim 26 wherein said activating mechanism includes an input chute and a pivotal food deflection means operatively attached to said input chute, said pivotal food deflection means being configured to guide the food product into said at least one food container.

* * * * *